(12) United States Patent
Xiao et al.

(10) Patent No.: US 10,950,836 B2
(45) Date of Patent: Mar. 16, 2021

(54) SEPARATORS FOR LITHIUM-CONTAINING ELECTROCHEMICAL CELLS AND METHODS OF MAKING THE SAME (71) Applicant: GM GLOBAL TECHNOLOGY OPERATIONS LLC, Detroit, MI (US)

(72) Inventors: Xingcheng Xiao, Troy, MI (US); Mei Cai, Bloomfield Hills, MI (US); Gongshin Qi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 253 days.

(21) Appl. No.: 15/878,653

(22) Filed: Jan. 24, 2018

(65) Prior Publication Data

US 2019/0229318 A1 Jul. 25, 2019

(51) Int. Cl.
*H01M 2/16* (2006.01)
*H01M 4/131* (2010.01)
*H01M 2/14* (2006.01)
*C01B 39/38* (2006.01)
*B01J 39/14* (2006.01)
*H01M 4/133* (2010.01)
*H01G 11/84* (2013.01)
*H01G 11/52* (2013.01)

(Continued)

(52) U.S. Cl.
CPC ........... *H01M 2/1646* (2013.01); *B01J 39/02* (2013.01); *B01J 39/14* (2013.01); *C01B 39/38* (2013.01); *H01G 11/30* (2013.01); *H01G 11/32* (2013.01); *H01G 11/52* (2013.01); *H01G 11/58* (2013.01); *H01G 11/84* (2013.01); *H01M 2/145* (2013.01); *H01M 2/1653* (2013.01); *H01M 2/1686* (2013.01); *H01M 4/131* (2013.01); *H01M 4/133* (2013.01); *H01M 10/0525* (2013.01); *H01G 11/50* (2013.01); *H01M 2220/20* (2013.01)

(58) Field of Classification Search
CPC .. H01M 2/1646; H01M 2/1686; H01M 4/131; B01J 39/14; C01B 39/38
See application file for complete search history.

(56) References Cited

U.S. PATENT DOCUMENTS 6,124,027 A * 9/2000 Ries .................. C23C 14/06 427/596
8,663,840 B2 3/2014 Nazri et al.
(Continued)

FOREIGN PATENT DOCUMENTS

| CN | 110071246 | 7/2019 | |
| DE | 102019100860 A1 | 7/2019 | |
| WO | WO-2012165624 A1 * | 12/2012 | ............. H01G 11/52 |

OTHER PUBLICATIONS

ZSM-5 Wikipedia, https://en.wikipedia.org/wiki/ZSM-5. Accessed Mar. 24, 2020. (Year: 2020).*

(Continued)

*Primary Examiner* — Jonathan G Jelsma
(74) *Attorney, Agent, or Firm* — Harness, Dickey & Pierce, P.L.C.

(57) ABSTRACT

A porous separator for a lithium-containing electrochemical cell is provided herein. The porous separator includes a porous substrate and an active layer comprising lithium ion-exchanged zeolite particles. Methods of manufacturing the porous separator and lithium-containing electrochemical cells including the porous separator are also provided herein.

13 Claims, 5 Drawing Sheets

(51) Int. Cl.
*H01G 11/58* (2013.01)
*H01G 11/30* (2013.01)
*H01G 11/32* (2013.01)
*B01J 39/02* (2006.01)
*H01M 10/0525* (2010.01)
*H01G 11/50* (2013.01)

(56) References Cited

U.S. PATENT DOCUMENTS

| | | |
|---|---|---|
| 8,974,946 B2 | 3/2015 | Cai et al. |
| 8,999,584 B2 | 4/2015 | Jiang et al. |
| 9,028,565 B2 | 5/2015 | Huang |
| 9,093,705 B2 | 7/2015 | Xiao et al. |
| 9,123,939 B2 | 9/2015 | Xiao et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,350,046 B2 | 5/2016 | Huang |
| 9,362,551 B2 | 6/2016 | Sachdev et al. |
| 9,362,552 B2 | 6/2016 | Sohn et al. |
| 9,537,144 B2 | 1/2017 | Huang et al. |
| 2008/0248381 A1* | 10/2008 | Hennige ............... H01M 2/145 429/129 |
| 2012/0229096 A1 | 9/2012 | Nazri |
| 2012/0231321 A1 | 9/2012 | Huang et al. |
| 2013/0284338 A1 | 10/2013 | Xiao et al. |
| 2014/0272526 A1 | 9/2014 | Huang |
| 2014/0272558 A1 | 9/2014 | Xiao et al. |
| 2015/0014890 A1 | 1/2015 | Xiao |
| 2016/0111721 A1 | 4/2016 | Xiao et al. |
| 2016/0285064 A1* | 9/2016 | Hatta .................... H01M 10/44 |
| 2018/0254449 A1 | 9/2018 | Xiao et al. |
| 2018/0254531 A1 | 9/2018 | Xiao et al. |
| 2019/0067744 A1 | 2/2019 | Xiao et al. |
| 2019/0091651 A1* | 3/2019 | Bhadra .............. B01D 53/0423 |

OTHER PUBLICATIONS

Geoffrey M. Johnson, Barbara A. Reisner, Akhilesh Tripathi, David R. Corbin, Brian H. Toby, and John B. Parise, "Flexibility and Cation Distribution upon Lithium Exchange of Aluminosilicate and Aluminogermanate Materials with the RHO Topology", Chem. Mater. 1999, 11, 2780-2787. (Year: 1999).*

* cited by examiner

SEPARATORS FOR LITHIUM-CONTAINING ELECTROCHEMICAL CELLS AND METHODS OF MAKING THE SAME

INTRODUCTION

The present disclosure relates generally to lithium-containing electrochemical cells and, more specifically, to separators for lithium-containing electrochemical cells and methods of manufacturing such separators.

An electrochemical cell, such as a battery, is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

High-energy density, electrochemical cells, such as lithium ion batteries can be used in a variety of consumer products and vehicles, such as Hybrid Electric Vehicles (HEVs) and Electric Vehicles (EVs). Typical lithium ion, lithium sulfur, and lithium metal batteries include a first electrode, a second electrode, an electrolyte material, and a separator. One electrode serves as a positive electrode or cathode and another serves as a negative electrode or anode. A stack of battery cells may be electrically connected to increase overall output. Conventional rechargeable lithium ion batteries operate by reversibly passing lithium-ions back and forth between the negative electrode and the positive electrode. A separator and an electrolyte are disposed between the negative and positive electrodes. The electrolyte is suitable for conducting lithium ions and may be in solid (e.g., solid state diffusion) or liquid form. Each of the negative and positive electrodes is typically carried on or connected to a metallic current collector, for example, in the form of a thin layer of electrode material. The current collectors may be connected to each other by an interruptible external circuit through which electrons can pass from one electrode to the other while lithium ions migrate in the opposite direction through the electrochemical cell during charging and discharge of the battery.

Lithium ion batteries can reversibly supply power to an associated load device on demand. More specifically, electrical power can be supplied to a load device by a lithium ion battery until the lithium content of the negative electrode is effectively depleted. The battery may then be recharged by passing a suitable direct electrical current in the opposite direction between the electrodes.

During discharge, the negative electrode may contain a relatively high concentration of intercalated lithium, which is oxidized into lithium ions and electrons. The lithium ions travel from the negative electrode (anode) to the positive electrode (cathode), for example, through the ionically conductive electrolyte solution contained within the pores of an interposed porous separator. At the same time, the electrons pass through the external circuit from the negative electrode to the positive electrode. The lithium ions may be assimilated into the material of the positive electrode by an electrochemical reduction reaction. The battery may be recharged after a partial or full discharge of its available capacity by an external power source, which reverses the electrochemical reactions that transpired during discharge.

During re-charge, intercalated lithium in the positive electrode is oxidized into lithium ions and electrons. The lithium ions travel from the positive electrode to the negative electrode through the porous separator via the electrolyte, and the electrons pass through the external circuit to the negative electrode. The lithium cations are reduced to elemental lithium at the negative electrode and stored in the material of the negative electrode for reuse.

SUMMARY

This section provides a general summary of the disclosure, and is not a comprehensive disclosure of its full scope or all of its features.

In certain aspects, the present disclosure provides a method of manufacturing a porous separator for a lithium-containing electrochemical cell. The method may include ion-exchanging precursor zeolite particles with $Li^+$ ions to form lithium ion-exchanged zeolite particles. The precursor zeolite particles may include one or more of the following cations: $H^+$, $NH_4^+$, $Na^+$, $K^+$, $Mg^{2+}$, and $Ca^+$. The lithium ion-exchanged zeolite particles may have: (i) an average pore size diameter of less than or equal to about 1 nm; and (ii) an average particle diameter of less than or equal to about 20 μm. The method may further include preparing a slurry including the lithium ion-exchanged zeolite particles and a polymeric binder material, and depositing a layer of the slurry on a first side, a second side, or both the first and second sides of a porous substrate. The method may further include drying the slurry to form an active layer on the first side, the second side, or both the first and second sides of the porous substrate. The active layer can have a thickness of less than or equal to about 20 μm.

The lithium ion-exchanged zeolite particles can have one or more of the following: (i) an average pore size diameter of about 0.01 nm to about 1 nm; (ii) an average particle diameter of about 10 nm to about 20 μm; and (iii) a $SiO_2:Al_2O_3$ ratio of about 10 to about 50. The active layer may have a thickness of about 50 nm to about 20 μm.

The lithium ion-exchanged zeolite particles may have pore openings defined by 8-member rings, 9-membered rings, 10-membered rings, 12-membered rings or a combination thereof.

The lithium ion-exchanged zeolite particles may include a zeolite material having a framework type selected from the group consisting of NAT, EDI, THO, ANA, YUG, GOO, MON, HEU, STT, BRE, FAU, MEI, LTL, LTA, and a combination thereof.

The lithium ion-exchanged zeolite particles may include a zeolite material selected from the group consisting of zeolite A, zeolite Y, zeolite L, ZSM-5, and a combination thereof.

The lithium ion-exchanged zeolite particles may include $H^+$ and $NH_4^+$ cations.

The lithium ion-exchanged zeolite particles may include less than or equal to about 1 at. % of one or more of $Na^+$, $K^+$, $Mg^{2+}$, $Ca^+$, $H^+$, and $NH_4^+$ cations.

The porous substrate may include a microporous polyolefin-based membrane or nonwoven fibers and/or the polymeric binder material may be formed from a polymeric binder system including a polymer precursor component and a crosslinking component.

In other aspects, the present disclosure provides a porous separator for a lithium-containing electrochemical cell. The lithium-containing electrochemical cell may include a porous substrate having a first side and an opposing second side and an active layer including lithium ion-exchanged zeolite particles. The lithium ion-exchanged zeolite particles may have: (i) an average pore size diameter of less than or equal to about 1 nm; (ii) an average particle diameter of less than or equal to about 20 μm; and (iii) less than or equal to about 5 at. % of one or more of the following cations: $Na^+$, $K^+$, $Mg^{2+}$, $Ca^+$, $H^+$, and $NH_4^+$. The active layer may be present on the first side, the second side or both the first and second sides of the porous substrate, and the active layer may have a thickness of less than or equal to about 20 µm.

The lithium ion-exchanged zeolite particles may be present in the active layer in an amount of about 20 to about 95 wt. %.

The lithium ion-exchanged zeolite particles may have one or more of the following: (i) an average pore size diameter of about 0.01 nm to about 1 nm; (ii) an average particle diameter of about 10 nm to about 20 µm; and (iii) a $SiO_2:Al_2O_3$ ratio of about 10 to about 50.

The lithium ion-exchanged zeolite particles may have pore openings defined by 8-member rings, 9-membered rings, 10-membered rings, 12-membered rings or a combination thereof.

The lithium ion-exchanged zeolite particles may include a zeolite material having a framework type selected from the group consisting of NAT, EDI, THO, ANA, YUG, GOO, MON, HEU, STT, BRE, FAU, MEI, LTL, LTA, and a combination thereof.

The lithium ion-exchanged zeolite particles may include a zeolite material selected from the group consisting of zeolite A, zeolite Y, zeolite L, ZSM-5, and a combination thereof.

The lithium ion-exchanged zeolite particles may include less than or equal to about 1 at. % of one or more of $Na^+$, $K^+$, $Mg^{2+}$, $Ca^+$, $H^+$ and $NH_4^+$ cations.

The active layer may further includes a polymeric binder.

The active layer may have a thickness of about 50 nm to about 20 µm.

In other aspects, the present disclosure provides a lithium-containing electrochemical cell. The lithium-containing electrochemical cell may include a negative electrode layer, a positive electrode layer spaced apart from the negative electrode layer, and a porous separator disposed between confronting surfaces of the negative electrode layer and the positive electrode layer. The porous separator may include a porous substrate having a first side and an opposing second side, and an active layer including lithium ion-exchanged zeolite particles. The lithium ion-exchanged zeolite particles may have: (i) an average pore size diameter of less than or equal to about 1 nm; (ii) an average particle diameter of less than or equal to about 20 µm; and (iii) less than or equal to about 1 at. % of one or more of the following cations: $Na^+$, $K^+$, $Mg^{2+}$, $Ca^+$, $H^+$, and $NH_4^+$. The active layer may be present on the first side, the second side or both the first and second sides of the porous substrate, and the active layer may have a thickness of less than or equal to about 20 µm. The lithium-containing electrochemical cell may further include a liquid electrolyte infiltrating the negative electrode layer, the positive electrode layer, and the porous separator.

The positive electrode layer may include sulfur.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "attached to" or "coupled to" another element or layer, it may be directly on, engaged, connected, attached or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," and the like). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

I. Lithium-Containing Electrochemical Cell

Lithium-containing electrochemical cells typically include a negative electrode, a positive electrode, an electrolyte for conducting lithium ions between the negative and positive electrodes, and a porous separator between the negative electrode and the positive electrode to physically separate and electrically insulate the electrodes from each other while permitting free ion flow. When assembled in an electrochemical cell, for example, in a lithium-ion battery or a lithium-sulfur battery, the porous separator is infiltrated with a liquid electrolyte. It has been discovered that lithium ion-exchanged zeolite particles present in an active layer on the porous separator, particularly lithium ion-exchanged zeolite particles having a smaller average pore size, smaller average particle diameter, and having a certain cation content as further described below, can actively remove trace water, hydrogen ions, hydrofluoric acid, dissociated transition metal ions (e.g., $Mn^{2+}$ and $Fe^{2+/3+}$ ions), polysulfides, and other target compounds from the liquid electrolyte without inhibiting the transport or net flow of lithium ions therethrough. The removal of these target compounds from the liquid electrolyte during operation of the battery can, in turn, help prevent or mitigate degradation of various battery components and thereby improve the life and cycle performance of the battery.

As used herein, the term "lithium ion-exchanged zeolite particle" means a zeolite that has been ion-exchanged with lithium ions such that a plurality of lithium ions are present within the zeolite as free ions and/or as extra-framework ions.

Figure 1:
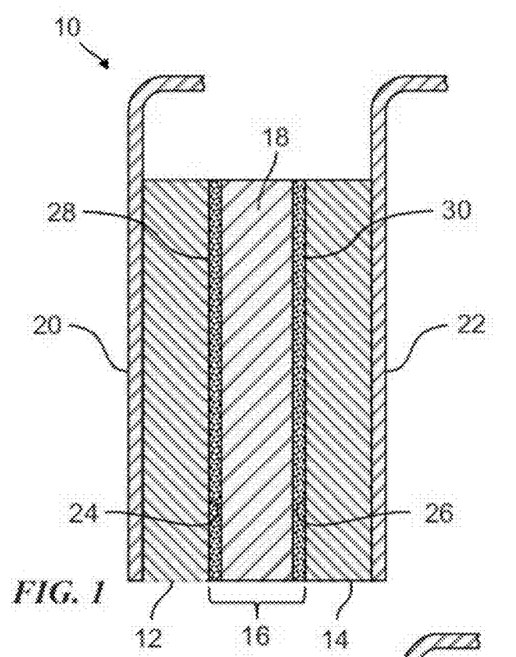
FIG. 1 is a cross-sectional view of a lithium-containing electrochemical cell along with its associate metallic current collectors according to one aspect of the disclosure.

A lithium-containing electrochemical cell for use in batteries, for example, a lithium ion battery or a lithium sulfur battery, or as capacitors is provided herein. The lithium-containing electrochemical cell may comprise a negative electrode layer, a positive electrode layer spaced apart from the negative electrode layer, a porous separator disposed between confronting surfaces of the negative electrode layer and the positive electrode layer, and a liquid electrolyte infiltrating the negative electrode layer, the positive electrode layer, and the porous separator. For example, as best shown in FIG. 1, a lithium-containing electrochemical cell 10 (also referred to herein as "the electrochemical cell 10" or "cell 10") of a lithium ion battery (not shown) includes lithium ion-exchanged zeolite particles disposed within a lithium ion transport path through the electrochemical cell 10. The electrochemical cell 10 comprises a negative electrode layer 12, a positive electrode layer 14, a porous separator 16, and a liquid electrolyte 18 that impregnates, infiltrates, or wets the surfaces of and fills the pores of each of the negative electrode layer 12, the positive electrode layer 14, and the porous separator 16. A negative electrode current collector 20 is positioned adjacent and electrically coupled to the negative electrode layer 12, and a positive electrode current collector 22 is positioned adjacent and electrically coupled to the positive electrode layer 14.

The negative and positive electrode layers 12, 14 may be coated, deposited, or otherwise formed on opposing major surfaces of the negative and positive electrode current collectors 20, 22, with the negative and positive electrode layers 12, 14 respectively having opposing, confronting first and second faces 24, 26. As shown in FIG. 1, in assembly, the porous separator 16 can be sandwiched between the first and second faces 24, 26 of the negative and positive electrode layers 12, 14, with the porous separator 16 including a first side 28 that faces toward and presses against a first face 24 of the negative electrode layer 12 and a second side 30 that faces toward and presses against a second face 26 of the positive electrode layer 14.

The electrochemical cell 10 may have a thickness, measured from an outer surface of the negative electrode current collector 20 to an opposite outer surface of the positive electrode current collector 22 in the range of about 100 μm to about 1 mm. Individually, the current collectors 20, 22 may have thicknesses of about 20 μm, the electrode layers 12, 14 may have thicknesses of up to 200 μm, and the porous separator 16 may have a thickness of about 25 μm.

In certain other variations, the electrochemical cell may be a supercapacitor, such as a lithium-ion based supercapacitor.

A. Negative Electrode

The negative electrode layer 12 may comprise any material that can undergo the reversible insertion, intercalation, or plating of lithium ions at a lower electrochemical potential than the material of the positive electrode layer 14 such that an electrochemical potential difference exists between the electrode layers 12, 14. In certain variations, the material of the negative electrode layer 12 may be generally described as an intercalation host material. Some examples of suitable intercalation host materials for the negative electrode layer 12 include carbon-based materials (e.g., graphite, activated carbon, carbon black, and graphene), lithium, lithium-based materials, silicon, silicon-based alloys or composite materials, tin oxide, aluminum, indium, zinc, germanium, silicon oxide, titanium oxide, lithium titanate, and combinations thereof. The intercalation host material of the negative electrode layer 12 may be intermingled with a polymeric binder to provide the negative electrode layer 12 with structural integrity. Some examples of suitable polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The negative electrode layer 12 optionally may include particles of an electrically conductive material, which may comprise very fine particles of, for example, high-surface area carbon black. In other variations, the negative electrode layer 12 may be a metal film or foil.

B. Positive Electrode

The positive electrode layer 14 may comprise any material that can undergo the reversible insertion, intercalation, or plating of lithium ions. In one form, the positive electrode layer 14 comprises a lithium-based intercalation host material having a higher electrochemical potential than the intercalation host material of the negative electrode layer 12. In certain variations, the intercalation host material of the positive electrode layer 14 suitably may comprise a layered oxide represented by the formula $LiMeO_2$, an olivine-type oxide represented by the formula $LiMePO_4$, a spinel-type oxide represented by the formula $LiMe_2O_4$, or a combination thereof, where Me is a transition metal. Some examples of suitable transition metals for the metal oxide of the intercalation host material of the positive electrode layer 14 include Co, Ni, Mn, Fe, Al, V, and combinations thereof. More specifically, the lithium-based intercalation host material may comprise a layered lithium transition metal oxide, such as lithium cobalt oxide ($LiCoO_2$) and lithium-nickel-manganese-cobalt oxide [$Li(Ni_xMn_yCo_z)O_2$], a spinel lithium transition metal oxide, such as spinel lithium manganese oxide ($LiMn_2O_4$), lithium iron phosphate ($LiFePO_4$), or lithium fluorophosphate ($Li_2FePO_4F$), lithium nickel oxide ($LiNiO_2$), lithium aluminum manganese oxide ($Li_xAl_yMn_{1-y}O_2$), lithium vanadium oxide ($LiV_2O_5$), or a combination thereof. The same polymeric binder materials (PVdF, EPDM, SBR, CMC, polyacrylic acid) and electrically conductive particles (high-surface area carbon black) used in the negative electrode layer 12 also may be intermingled with the lithium-based intercalation host material of the positive electrode layer 14 for the same purposes.

Alternatively, the positive electrode layer 14 can comprise sulfur, for example, where the electrochemical cell is for use as a lithium sulfur battery. While in lithium ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode. In a lithium sulfur battery, positive electrodes may have elemental sulfur as the active material or a sulfur-containing active material.

C. Electrolyte

The electrolyte 18 may comprise any material that is capable of effectively conducting lithium ions through the porous separator 16 and between the negative and positive electrodes 12, 14. For example, the electrolyte 18 may be a liquid comprising a non-aqueous liquid electrolyte. In such case, the liquid electrolyte 18 may comprise a solution including a lithium salt dissolved or ionized in a nonaqueous, aprotic organic solvent or a mixture of nonaqueous, aprotic organic solvents. Some suitable lithium salts that may be used to make the electrolyte 18 include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and combinations thereof. The nonaqueous, aprotic organic solvent in which the lithium salt is dissolved may be a cyclic carbonate (i.e., ethylene carbonate, propylene carbonate), an acyclic carbonate (i.e., dimethyl carbonate, diethyl carbonate, ethyl methyl carbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a combination thereof.

D. Electrode Current Collectors

The negative and positive electrode current collectors 20, 22 respectively associated with the negative and positive electrode layers 12, 14 may comprise any metallic material capable of collecting and reversibly passing free electrons to and from their respective electrode layers 12, 14. For example, the negative and positive electrode current collectors 20, 22 may comprise thin and flexible metallic foils. In one specific example, the positive electrode current collector 22 may comprise aluminum, nickel, or stainless steel foils and the negative electrode current collector 20 may comprise copper, nickel, stainless steel, or titanium foils. Other types of metal foils or metallic materials may of course be used, if desired.

E. Porous Separator and Methods of Manufacturing the Same

Figure 2:
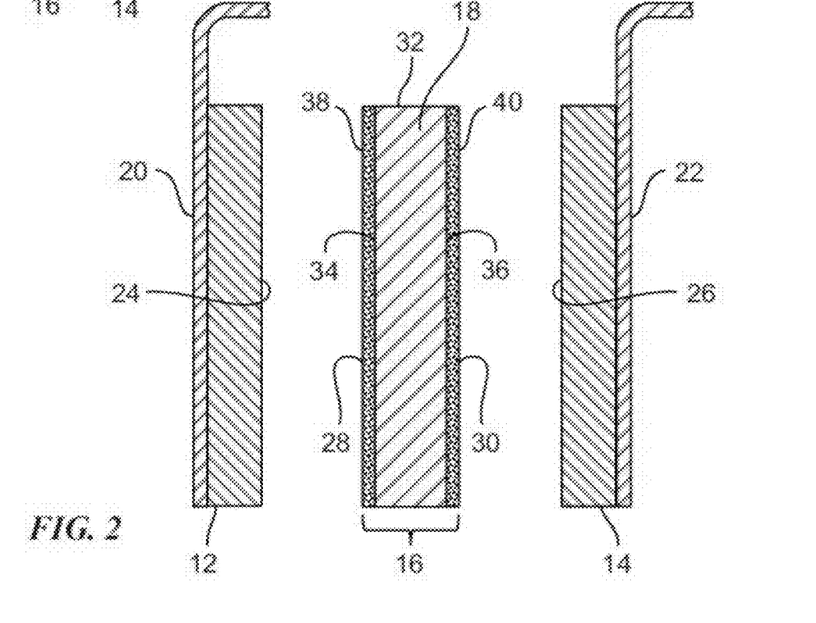
FIG. 2 is an exploded cross-sectional view of the lithium-containing electrochemical cell of FIG. 1.

A porous separator for a lithium-containing electrochemical cell is provided herein. The porous separator may include a porous substrate and an active layer comprising lithium ion-exchanged zeolite particles. For example, as shown in FIG. 2, the porous separator 16 may include a porous substrate 32 having a first side 34 and an opposing second side 36. The active layer that includes lithium ion-exchanged zeolite particles may be present on one or both sides 34, 36 of the substrate 32. In some embodiments, as shown in FIG. 2, the first side 34 of the substrate 32 may be coated with a first active layer 38, and the second side 36 of the substrate 32 may be coated with a second active layer 40. In assembly, the first active layer 38 faces toward and presses against the first face 24 of the negative electrode layer 12, and the second active layer 40 faces toward and presses against the second face 26 of the positive electrode layer 14. However, in other embodiments, the first side 34 of the substrate 32 may be coated with the first active layer 38 and the second side 36 of the substrate 32 may be uncoated such that, in assembly, the second side 36 of the substrate 32 faces toward and presses against the second face 26 of the positive electrode layer 14. In other embodiments, the second side 36 of the substrate 32 may be coated with the second active layer 40 and the first side 34 of the substrate 32 may be uncoated such that, in assembly, the first side 34 of the substrate 32 faces toward and presses against the first face 24 of the negative electrode layer 12.

The active layer, for example, the first and/or second active layers 38, 40 may be continuously or discontinuously formed on the first and/or second sides 34, 36 of the substrate 32. For example, the first active layer 38 may be formed on the first side 34 of the substrate 32 such that the active layer 38 covers an entire surface area or only a portion of the surface area on the first side 34 of the substrate 32. Likewise, the second active layer 40 may be formed on the second side 36 of the substrate 32 such that the second active layer 40 covers an entire surface area or only a portion of the surface area on the second side 36 of the substrate 32. The active layers 38, 40 may extend over the first and second sides 34, 36 of the substrate 32 and, in some instances, may extend partway into the micropores of the substrate 32.

The porous substrate 32 may comprise any organic or inorganic material that can physically separate and electrically insulate a positive and negative electrode from each other while permitting the free flow of lithium ions therebetween. For example, the substrate 32 may comprise composite material or a nonwoven material, e.g., a manufactured sheet, web, or matt of directionally or randomly oriented fibers, including but not limited to cotton, nylon, polyesters, glass and a combination thereof. As another example, the substrate 32 may comprise a microporous polymeric material, e.g., a microporous polyolefin-based membrane or film. The porous substrate 32 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In some embodiments, the porous substrate 32 may comprise a laminate of one or more polymeric materials, such as a laminate of PE and PP. The substrate 32 may have a thickness, measured between the first and second sides 34, 36 of the substrate 32, in the range of about 10 µm to about 30 µm.

In some embodiments, the active layer, for example, the first and/or second active layers 38, 40, may have thicknesses of less than or equal to about 25 µm, less than or equal to about 20 µm, less than or equal to about 10 µm, less than or equal to about 5 µm, less than or equal to about 1 µm, or about 50 nm. Additionally or alternatively, the active layer, for example, the first and/or second active layers 38, 40, may have thicknesses in the range of about 50 nm to about 20 µm, about 50 nm to about 10 µm, or about 50 nm to about 5 µm. As compared to the thickness of the substrate 32, the thickness of either of the active layers 38, 40 may be less than that of the substrate 32. For example, the thickness of either of the active layers 38, 40 may be 50% or less than the thickness of the substrate 32.

The lithium ion-exchanged zeolite particles may comprise or consist essentially of particles of one or more natural or synthetic zeolite materials. Zeolites are microporous crystalline aluminosilicate materials comprising a three-dimensional framework of $AlO_2$ and $SiO_2$ tetrahedral units and extra-framework cations. Each $AlO_2$ unit introduces one negative charge to the framework, which is offset by the extra-framework cations. The extra-framework cations may be organic or inorganic in nature. In various aspects, the lithium ion-exchanged zeolite particles may comprise a three-dimensional framework of $AlO_2$ and $SiO_2$ tetrahedral units and extra-framework lithium cations ($Li^+$). The amount of extra-framework lithium cations present in the lithium ion-exchanged zeolite particles can at least partially depend on the Si:Al ratio of the specific zeolite material and the cation exchange capacity (CEC) of the zeolite material. In the lithium ion-exchanged zeolite particles, lithium cations (Li+) may comprise greater than or equal to about 90 atomic % (at. %), greater than or equal to about 95 at. %, greater than or equal to 99 at. %, or about 100 at. % of the extra-framework cations in the zeolite particles. In some embodiments, the zeolite may be in dehydrated form.

In some embodiments, the lithium ion-exchanged zeolite particles, for example, prior to operation in an electrochemical cell, may comprise less than or equal to about 10 at. %, less than or equal to about 5 at. %, or less than or equal to about 1 at. % of one or more of the following extra-framework cations: $Na^+$, $K^+$, $Mg^{2+}$, $Ca^+$, $H^+$, and $NH_4^+$. In some embodiments, the lithium ion-exchanged zeolite particles may comprise less than or equal about 1 at. % of one or more of $H^+$ and $NH_4^+$. In some embodiments, the lithium ion-exchanged zeolite particles may comprise one or more of $H^+$ and $NH_4^+$ in an amount greater than one or more of the following cations: $Na^+$, $K^+$, $Mg^{2+}$, and $Ca^+$. Additionally or alternatively, the lithium ion-exchanged zeolite particles may be substantially free of one or more of: $Na^+$, $K^+$, $Mg^{2+}$, and $Ca^+$ cations.

It has been discovered that a more uniform active layer on a substrate for a porous separator can be achieved when the lithium ion-exchanged zeolite particles have a smaller average particle diameter. For example, the lithium ion-exchanged zeolite particles may have an average particle diameter of less than or equal to about 20 µm, less than or equal to about 15 µm, less than or equal to about 10 µm, less than or equal to about 5 µm, less than or equal to about 1 µm, less than or equal to about 100 nm, less than or equal to about 50 nm, or about 10 nm. Additionally or alternatively, the lithium ion-exchanged zeolite particles may have an average particle diameter of greater than or equal to about 10 nm to less than or equal to about 20 µm, greater than or equal to about 10 nm to less than or equal to about 10 µm, greater than or equal to about 10 nm to less than or equal to about 5 µm or greater than, or equal to about 10 nm to less than or equal to about 1 µm.

The crystal structures of zeolites include interstitial spaces (or cages) of molecular dimensions. As such, zeolites may be used as adsorbents to selectively adsorb molecules by retaining the molecules within their interstitial spaces. Access to the interstitial spaces within a zeolite is provided by pore openings (or channels) in the crystal lattice of the zeolite, which are defined by rings of interconnected oxygen (O), silicon (Si), and/or aluminum (Al) atoms. The size and shape of these pore openings limit the size and shape of the molecules that can be adsorbed by the zeolite and are determined, at least in part, by the number of tetrahedral units (or, alternatively, oxygen atoms) that make up the rings and by the type of extra-framework cations present within the zeolite. Thus, the lithium-exchanged zeolite particles may have an average pore size diameter capable of one or more of the following: (i) selectively absorbing water molecules (e.g., trace amounts) from the liquid electrolyte, without adsorbing the organic solvent molecules or the lithium salt ions in the electrolyte solution in the electrolyte; and (ii) allowing substantially only $Li^+$ ions through the separator while blocking polysulfide migration, for example, in a lithium sulfur battery. In some embodiments, the lithium ion-exchanged zeolite particles may have an average pore size diameter larger than the ionic radius of water ($H_2O$), but less than the ionic radius of the organic solvent molecules in the electrolyte solution. In particular, the lithium ion-exchanged zeolite particles may have an average pore size diameter of less than or equal to about 1.5 nm, less than or equal to about 1 nm, less than or equal to about 0.75 nm, less than or equal to about 0.5 nm, less than or equal to about 0.25 nm, less than or equal to about 0.1 nm, or about 0.01 nm. Additionally or alternatively, the lithium ion-exchanged zeolite particles may have an average pore size diameter of greater than or equal to about 0.01 nm to less than or equal to about 1.5 nm, greater than or equal to about 0.01 nm to less than or equal to about 1 nm, greater than or equal to about 0.1 nm to less than or equal to about 1 nm, or greater than or equal to about 0.25 nm to less than or equal to about 0.75 nm. Zeolite materials having pore openings with widths or diameters as described above may include zeolite materials having pore openings defined by 8-membered, 9-membered, 10-membered, and/or 12-membered rings.

Zeolite materials may be categorized based upon the crystalline structure of their corner-sharing network of tetrahedrally coordinated atoms or T-atoms (e.g., Si and Al). Zeolite structures are typically described or defined by reference to a framework type code consisting of three capital letters and assigned by the International Zeolite Association ("IZA"). A listing of all framework type codes assigned by the IZA can be found in the Atlas of Zeolite Framework Types, Sixth Revised Edition, Elsevier (2007).

In some embodiments, the lithium ion-exchanged zeolite particles may comprise particles of a zeolite material having a $SiO_2:Al_2O_3$ ratio of less than or equal to about 50, less than or equal to about 40, less than or equal to about 30, less than or equal to about 20, or about 10. The lithium ion-exchanged zeolite particles may comprise particles of a zeolite material having a $SiO_2:Al_2O_3$ ratio in the range of greater than or equal to about 10 to less than or equal to about 50, greater than or equal to about 10 to less than or equal to about 40, greater than or equal to about 10 to less than or equal to about 20, greater than or equal to about 20 to less than or equal to about 50, about 20 to about 40, or about 30 to about 50. In some embodiments, lithium ion-exchanged zeolite particles with more $SiO_2$ compared to $Al_2O_3$, for example, having a $SiO_2:Al_2O_3$ ratio greater than about 10, are preferred, for example, for increased stability. In other embodiments, lithium ion-exchanged zeolite particles with more $Al_2O_3$ compared to $SiO_2$, for example, having a $SiO_2:Al_2O_3$ ratio less than about 10, are preferred, for example, for an increased hydrofluoric acid (HF) scavenger function of the porous separator to protect the positive electrode.

The lithium ion-exchanged zeolite particles may comprise a zeolite material having a framework type selected from the group consisting of NAT, EDI, THO, ANA, YUG, GOO, MON, HEU, STI, BRE, FAU, MFI, LTL, LTA, and a combination thereof. For example, the lithium ion-exchanged zeolite particles may comprise a zeolite material selected from the group consisting of zeolite A, zeolite Y, zeolite L, ZSM-5, and a combination thereof.

The lithium ion-exchanged zeolite particles within active layer, for example, the first active layer 38 and/or the second active layer 40, are positioned within a lithium ion transport path through the electrochemical cell 10. During operation of the electrochemical cell 10, lithium ions can be communicated back and forth between the negative electrode layer 12 and the positive electrode layer 14 of the electrochemical cell 10, and the lithium ion-exchanged zeolite particles may be positioned such that, during this back and forth movement, the lithium ions necessarily encounter one or more of the lithium ion-exchanged zeolite particles. The lithium ions may come into contact with or travel around or through the lithium ion-exchanged zeolite particles during their movement through the electrochemical cell 10. The lithium ion-exchanged zeolite particles are formulated or selected, to adsorb, scavenge, entrap or otherwise inhibit the movement of certain target compounds within the electrochemical cell 10, without adversely affecting the transport or net flow of lithium ions through the electrochemical cell 10. For example, the particles of the lithium ion-exchanged zeolite particles may be formulated or selected based on the above-described pore size diameter, average particle size diameter, and/or cation content, to entrap or inhibit the movement of water molecules, polysulfide molecules, hydrogen ions, HF, and transition metal ions, such as $Mn^{2+}$ and $Fe^{2+/3+}$ ions, within the electrochemical cell 10. The target compounds may be entrapped within the lithium ion-exchanged zeolite particles either physically, chemically, or both physically and chemically.

As such, including the lithium ion-exchanged zeolite particles within the active layer, for example, the first and/or second active layers 38, 40, can help prevent a phenomenon referred to as "voltage droop," reduce capacity fade and impedance, improve Coulombic Efficiency, help maintain uniform current distribution along the electrode/electrolyte interface, reduce corrosion, and prevent outgassing of the cell 10.

Without intending to be bound by theory, it is believed that the lithium ion-exchanged zeolite particles may advantageously help improve the cycle performance of the electrochemical cell 10, for example, by trapping trace water, scavenging hydrofluoric acid (HF), and/or blocking polysulfide migration. Immobilizing trace water molecules within the electrochemical cell 10 may help prevent decomposition of the liquid electrolyte 18, which in turn may help prevent decomposition of the lithium-based intercalation host material of the positive electrode layer 14. Hydrofluoric acid is highly corrosive and may be generated in the electrochemical cell 10 during decomposition of the electrolyte, in particular, by reaction of $LiPF_6$ with water according to the following reaction:

$$LiPF_6 + H_2O \leftrightarrow LiF + POF_3 + 2HF \qquad (1)$$

The as-produced HF may increase the acidity of the liquid electrolyte 18, which may lead to corrosion of the lithium-based intercalation host material of the positive electrode layer 14 and/or the current collectors 20, 22. Therefore, by functioning as an HF scavenger, the lithium ion-exchanged zeolite particles in the active layer, for example, within the first and/or second active layers 38, 40, may help reduce corrosion and degradation of the various components of the cell 10.

Furthermore, it is believed that the lithium ion-exchanged zeolite particles in the active layer, for example, within the first and/or second active layers 38, 40 may help improve the cycle performance of the electrochemical cell 10 by trapping transition metal ions, such as $Mn^{2+}$ and $Fe^{2+/3+}$ ions, which may be present in the liquid electrolyte 18 due to decomposition of the lithium-based intercalation host material of the positive electrode layer 14 and/or due to the presence of transition metal impurities in the positive electrode layer 14. Also, the lithium ion-exchanged zeolite particles within the first and/or second active layers 38, 40 on the substrate 32 may help improve the robustness of the cell 10, for example, by improving the mechanical properties and thermal stability of the separator 16.

The lithium ion-exchanged zeolite particles may be prepared by any suitable known ion-exchanging processes. The zeolite particles prior to ion-exchange with lithium are referred to herein as "precursor zeolite particles." The precursor zeolite particles may have a framework selected from the group consisting of NAT, EDI, THO, ANA, YUG, GOO, MON, HEU, STI, BRE, FAU, MFI, LTL, LTA, and a combination thereof. For example, the precursor zeolite particles may comprise a zeolite material selected from the group consisting of zeolite A, zeolite Y, zeolite L, ZSM-5, and a combination thereof. Furthermore, the precursor zeolite particles and the lithium ion-exchanged zeolite particles formed therefrom may have substantially the same pore size diameter, substantially the same particle size diameter and substantially the same $SiO_2:Al_2O_3$ ratio as described herein. For example, ZSM-5 particles (precursor zeolite particles) having an average pore diameter of about 0.5 nm, an average particle size diameter of 100 nm and a $SiO_2:Al_2O_3$ ratio of about 20 may be ion-exchanged to form lithium ion-exchanged ZSM-5 particles having substantially the same pore size diameter, particle size diameter and $SiO_2:Al_2O_3$ ratio as the initial ZSM-5 particles. It is contemplated herein, that following ion-exchange of the precursor zeolite particles, that the resultant lithium ion-exchanged zeolite particles may have some variation (e.g., about 1-5%) in pore size diameter, particle size diameter and $SiO_2:Al_2O_3$ ratio compared to the precursor zeolite particles.

An exemplary ion-exchange process may include the following general steps: (1) obtaining a suitable amount of precursor zeolite particles in powder form and having exchangeable extra-framework cations, (2) contacting the precursor zeolite particles with a solution comprising at least one lithium salt dissolved in a solvent at a sufficient temperature and for a sufficient amount of time for at least some of the exchangeable extra-framework cations within the zeolite material to be replaced or exchanged with lithium ions to produce the lithium ion-exchanged zeolite particles, (3) separating the lithium ion-exchanged zeolite particles from the solvent, and (4) heat treating the lithium ion-exchanged zeolite particles at a temperature greater than about 400° C. to release adsorbed water therefrom.

The precursor zeolite particles may have as initial exchangeable cations one or more hydrogen-containing ions or ions of an alkali metal or an alkaline earth metal. In particular, the precursor zeolite particles may have as initial exchangeable cations one or more ions of hydrogen, ammonium, lithium, sodium, potassium, rubidium, cesium, francium, beryllium, magnesium, calcium, strontium, barium, and radium. In some embodiments, the precursor zeolite particles may comprise one or more of the following cations: $H^+$, $NH_4^+$, $Na^+$, $K^+$, $Mg^{2+}$, and/or $Ca^+$. Preferably, the precursor zeolite particles may comprise $H^+$ and/or $NH_4^+$ cations, for example, in an amount greater than one or more of the following cations: $Na^+$, $K^+$, $Mg^{2+}$ and $Ca^+$.

The precursor zeolite particles may be contacted by an aqueous or non-aqueous solution of a lithium salt, which may be at a temperature of greater than 50° C. during the ion-exchange process. The lithium salt may comprise lithium hydroxide, lithium carbonate, lithium chloride, lithium nitrate, lithium sulfate, or a combination thereof. The concentration of the lithium salt in the solution may be in the range of 0.1 M to 2 M and may be adjusted during the lithium ion-exchange treatment process to ensure a sufficient amount of the initial exchangeable cations in the precursor zeolite particles is replaced with lithium ions. The lithium ion-exchanged zeolite particles may be separated from the solvent after ion exchange is complete by any suitable method, for example, by centrifuge. The lithium ion-exchanged zeolite particles may be cleaned by removing residual ions and solvent therefrom, for example, by being washed with deionized water. Thereafter, the lithium ion-exchanged zeolite particles may be calcined by being heated at a temperature greater than about 100° C. for a sufficient time to remove adsorbed water therefrom. The lithium ion-exchanged zeolite particles may be calcined in a dry environment or in a vacuum to accelerate the water removal process. For example, the lithium ion-exchanged zeolite particles may be calcined in an environment having less than 20% relative humidity, or in an environment as dry as possible. In one form, the lithium ion-exchanged zeolite particles may be calcined by being heated at a temperature in the range of 400-600° C. for a time between 1 to 5 hours. In one specific example, the lithium ion-exchanged zeolite particles may be calcined by being heated at a temperature of 450° C. for about 2 hours.

Atmospheric moisture may be readily absorbed by the lithium ion-exchanged particles after calcination. Therefore, to avoid introducing water into the electrochemical cell 10 along with the lithium ion-exchanged zeolite particles, care should be taken to avoid exposing the particles to atmospheric moisture after the calcination step is complete, prior to and during assembly of the cell 10. For example, prior to incorporating the lithium ion-exchanged zeolite particles in the electrochemical cell 10, the particles may be transferred from the calcination step and stored in a dry environment. If the lithium ion-exchanged zeolite particles are exposed to water, including atmospheric moisture, at any point prior to assembly of the electrochemical cell 10, an additional heat treatment step may be performed to eliminate trace water from the particles. The additional heat treatment step may be performed at a temperature greater than about 100° C. for a sufficient time to remove trace water from the lithium ion exchanged zeolite particles.

In various aspects, a method of manufacturing a porous separator, for example, the separator 16, is provide herein. The method may include ion-exchanging precursor zeolite particles as described herein with $Li^+$ ions to form the lithium ion-exchanged particles as described herein. In some embodiments, the ion-exchanging step may be performed as described above. The method may further include preparing a slurry or mixture comprising the lithium ion-exchanged particles and a polymeric binder material.

The active layer as described herein, for example, the first and second active layers 38, 40, comprising the lithium ion-exchanged zeolite particles may be formed on the first and/or second sides 34, 36 of the substrate 32 by coating or otherwise depositing a layer of the slurry including the lithium ion-exchanged zeolite particles and the polymeric binder material on the first and/or second sides 34, 36 of the substrate 32, and then drying the slurry. Thus, the active layer may further comprise a polymeric binder. At the time the slurry is deposited on the first and/or second sides 34, 36 of the substrate 32, the slurry may have a viscosity in the range 400-1200 mPa·s and may be at a temperature of about 25° C.

The lithium ion-exchanged zeolite particles may be present in the slurry in an amount ranging from about 10 wt. % to about 30 wt. %. The lithium ion-exchanged zeolite particles may be present in the active layer in amount of at least about 10 wt. %, at least about 20 wt. %, at least about 40 wt. %, at least about 60 wt. %, at least about 80 wt. %, at least about 90 wt. %, or about 95 wt. %. Additionally or alternatively, the lithium ion-exchanged zeolite particles may be present in the active layer in an amount of about 10 to about 95 wt. %, about 20 to about 95 wt. %, about 40 to about 95 wt. % or about 80 to about 95 wt. %.

The polymeric binder material may be present in the slurry in an amount ranging from about 1.5 wt. % to about 8 wt. %. The polymeric binder material may be present in the active layer, for example, the first and/or second active layers 38, 40, in an amount ranging from about 5 wt. % to about 80 wt. %.

The mass ratio of the lithium ion-exchanged zeolite particles to the polymeric binder material in the slurry may be in the range of about 20:1 to about 5:4. For example, the mass ratio of the lithium ion-exchanged zeolite particles to the polymeric binder material in the slurry may be about 20:3.

The polymeric binder material may comprise any material that comprises or contains a polymer and may include composite materials that include a combination of a polymer and a non-polymeric material. The term "polymer" is used in its broad sense to denote both homopolymers and heteropolymers. Homopolymers are made of a single type of polymer, while heteropolymers (also known as copolymers) are made of two (or more) different types of monomers. In one form, the polymeric binder material may be formed from a two-component polymeric binder system that includes a polymer precursor component and a crosslinking component. In such case, the slurry may be prepared by a process that includes the following general steps: (1) providing a polymer precursor component including a polymer or polymer precursor (e.g., monomer or oligomer) dissolved or homogenously dispersed in a solvent, (2) mixing lithium ion-exchanged zeolite particles in the polymer precursor component to form an intermediate mixture, and then (3) mixing a crosslinking component into the intermediate mixture to form the slurry. The intermediate mixture may have a viscosity in the range 400-1200 mPa·s at a temperature of about 25° C. When the polymer precursor component and the crosslinking component are combined during formation of the slurry, a chemical reaction referred to as polymerization occurs between the components which causes the components to bind together (e.g., by the formation of stable covalent bonds) to form crosslinked networks known as polymers. The mass ratio of the polymer precursor component to the crosslinking component may be in the range of about 10:1 to about 5:1. For example, the mass ratio of the polymer precursor component to the crosslinking component may be about 9:1.

Additional solvent may be added to the polymer precursor component and/or the intermediate mixture to control or adjust the viscosity and/or the thixotropic or rheological properties of the slurry prior to addition of the crosslinking component. Some specific examples of suitable aqueous and non-aqueous solvents that may be included in or added to the polymer precursor component and/or the intermediate mixture include: water, N-methyl-2-pyrrolidone (NMP), toluene, and combinations thereof.

Some specific examples of suitable polymer precursor components include: alginate (e.g., sodium and/or ammonium alginate), polyvinyl alcohol (PVA), polyacrylic acid (PAA), carboxymethyl cellulose (CMC), styrene-butadiene rubber (SBR), fluorine-acrylic hybrid latex, and combinations thereof.

The crosslinking component may comprise a polymeric material or a non-polymeric material. For example, the crosslinking component may comprise a polymer or polymer precursor (e.g., monomer or oligomer). Some specific examples of suitable crosslinking components include: dimethylol urea, melamine formaldehyde resin, polyamideepichlorohydrin (PAE) resin, N-(1-hydroxy-2,2-dimethoxyethyl)acrylamide, N,N'-methylenebisacrylamide, ethylene glycol dimethacrylate, and combinations thereof.

The slurry may be coated or otherwise applied to substrate, for example, the first and/or second sides 34, 36 of the substrate 32, by any suitable method. For example, the slurry may be spread or cast onto the first and/or second sides 34, 36 of the substrate 32. Thereafter the slurry may be dried to remove the solvent and to complete the crosslinking or polymerization reaction by heating the substrate 32 at a temperature in the range of about 30° C. to about 140° C. for about 3 minutes to about 2 hours. In one specific example, the slurry may be dried by heating the substrate 32 at a temperature of about 80° C. for about 3 minutes. Thereafter, the substrate 32, including the first and/or second active layers 38, 40, may be held at room temperature and exposed to a subatmospheric pressure environment for a time in the range of 3 hours to 12 hours to remove residual volatile compounds (e.g., water) therefrom. In one specific example, the substrate 32, including the first and/or second active layers 38, 40, may be held at room temperature and exposed to a subatmospheric pressure environment for 3 hours prior to being incorporated into the electrochemical cell 10. In some instances, the slurry may be applied to the first or second side 34, 36 of the substrate 32 and dried, and then the slurry may be applied to the opposite side 34, 36 of the substrate 32 and dried prior to exposing the substrate and the layers 38, 40 to the subatmospheric pressure environment.

II. Battery

Figure 3:
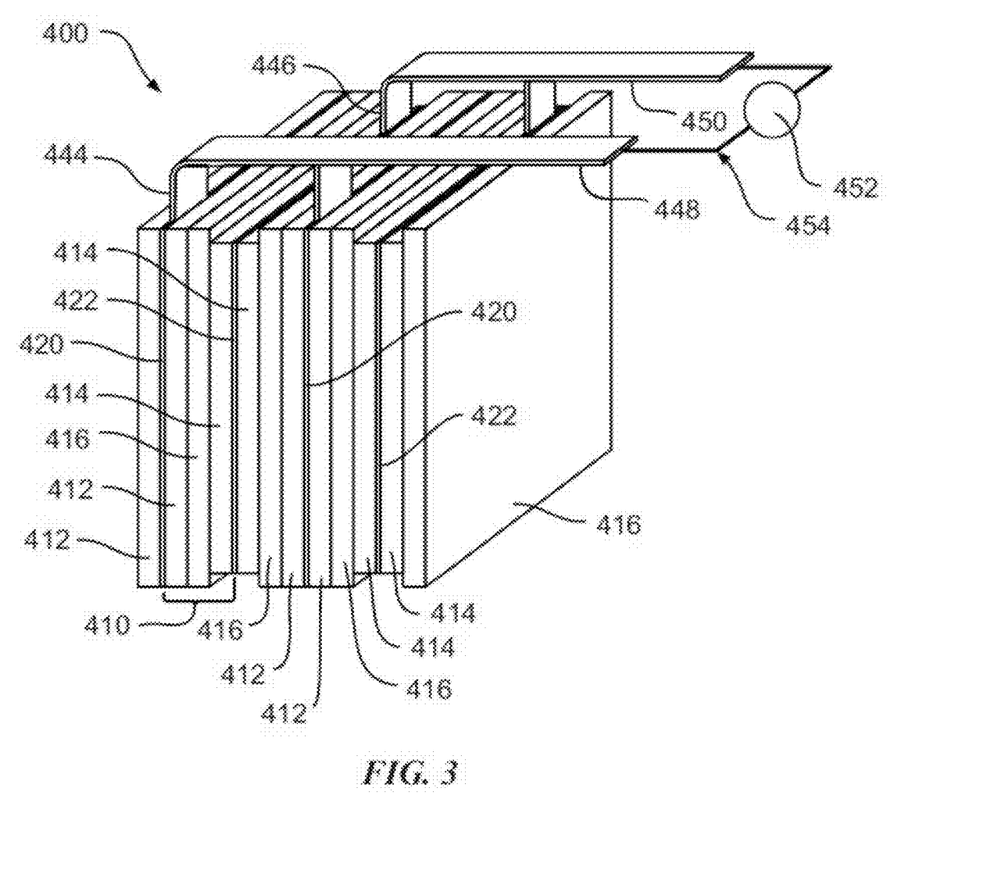
FIG. 3 is a partial perspective view of a lithium ion battery including a plurality of stacked electrochemical cells according to one aspect of the disclosure.

Referring now to FIG. 3, the electrochemical cell 10 may be combined with one or more other electrochemical cells to produce a lithium ion battery 400. The lithium ion battery 400 illustrated in FIG. 3 includes multiple rectangular-shaped electrochemical cells 410. Anywhere from 5 to 150 electrochemical cells 410 may be stacked side-by-side in a modular configuration and connected in series or parallel to form a lithium ion battery 400, for example, for use in a vehicle powertrain. The lithium ion battery 400 can be further connected serially or in parallel to other similarly constructed lithium ion batteries to form a lithium ion battery pack that exhibits the voltage and current capacity demanded for a particular application, e.g., for a vehicle. It should be understood the lithium ion battery 400 shown in FIG. 3 is only a schematic illustration, and is not intended to inform the relative sizes of the components of any of the electrochemical cells 410 or to limit the wide variety of structural configurations a lithium ion battery 400 may assume. Various structural modifications to the lithium ion battery 400 shown in FIG. 3 are possible despite what is explicitly illustrated.

Each electrochemical cell 410 includes a negative electrode 412, a positive electrode 414, and a separator 416 situated between the two electrodes 412, 414. Each of the negative electrode 412, the positive electrode 414, and the separator 416 is impregnated, infiltrated, or wetted with a liquid electrolyte capable of transporting lithium ions. A negative electrode current collector 420 that includes a negative polarity tab 444 is located between the negative electrodes 412 of adjacent electrochemical cells 410. Likewise, a positive electrode current collector 422 that includes a positive polarity tab 446 is located between neighboring positive electrodes 414. The negative polarity tab 444 is electrically coupled to a negative terminal 448 and the positive polarity tab 446 is electrically coupled to a positive terminal 450. An applied compressive force usually presses the current collectors 420, 422, against the electrodes 412, 414 and the electrodes 412, 414 against the separator 416 to achieve intimate interfacial contact between the several contacting components of each electrochemical cell 410.

One or more of the separators 416 may comprise a porous separator, like the porous separator 16 depicted in FIGS. 1 and 2. In such case, the one or more separators 416 each may include a porous substrate having an active layer formed on one or both of its first and/or second sides, with each of the active layer(s) including lithium ion-exchanged zeolite particles as described herein.

In the embodiment depicted in FIG. 3, the battery 400 includes two pairs of positive and negative electrodes 412, 414. In other embodiments, the battery 400 may include more than two pairs of positive and negative electrodes 412, 414. In one form, the battery 400 may include 15-60 pairs of positive and negative electrodes 412, 414. In addition, although the battery 400 depicted in FIG. 3 is made up of a plurality of discrete electrodes 412, 414 and separators 416, other arrangements are certainly possible. For example, instead of discrete separators 416, the positive and negative electrodes 412, 414 may be separated from one another by winding or interweaving a single continuous separator sheet between the positive and negative electrodes 412, 414. In another example, the battery 400 may include continuous and sequentially stacked positive electrode, separator, and negative electrode sheets folded or rolled together to form a "jelly roll."

The negative and positive terminals 448, 450 of the lithium ion battery 400 are connected to an electrical device 452 as part of an interruptible circuit 454 established between the negative electrodes 412 and the positive electrodes 414 of the many electrochemical cells 410. The electrical device 452 may comprise an electrical load or power-generating device. An electrical load is a power-consuming device that is powered fully or partially by the lithium ion battery 400. Conversely, a power-generating device is one that charges or re-powers the lithium ion battery 400 through an applied external voltage. The electrical load and the power-generating device can be the same device in some instances. For example, the electrical device 452 may be an electric motor for a hybrid electric vehicle or an extended range electric vehicle that is designed to draw an electric current from the lithium ion battery 400 during acceleration and provide a regenerative electric current to the lithium ion battery 400 during deceleration. The electrical load and the power-generating device can also be different devices. For example the electrical load may be an electric motor for a hybrid electric vehicle or an extended range electric vehicle and the power-generating device may be an AC wall outlet, an internal combustion engine, and/or a vehicle alternator.

The lithium ion battery 400 can provide a useful electrical current to the electrical device 452 by way of the reversible electrochemical reactions that occur in the electrochemical cells 410 when the interruptible circuit 454 is closed to connect the negative terminal 448 and the positive terminal 450 at a time when the negative electrodes 412 contain a sufficient quantity of intercalated lithium (i.e., during discharge). When the negative electrodes 412 are depleted of intercalated lithium and the capacity of the electrochemical cells 410 is spent. The lithium ion battery 400 can be charged or re-powered by applying an external voltage originating from the electrical device 452 to the electrochemical cells 410 to reverse the electrochemical reactions that occurred during discharge.

Although not depicted in the drawings, the lithium ion battery 400 may include a wide range of other components. For example, the lithium ion battery 400 may include a casing, gaskets, terminal caps, and any other desirable components or materials that may be situated between or around the electrochemical cells 410 for performance related or other practical purposes. For example, the lithium ion battery 400 may be enclosed within a case (not shown). The case may comprise a metal, such as aluminum or steel, or the case may comprise a film pouch material with multiple layers of lamination. In one form, lithiated zeolite particles may be disposed on a surface of the case for the lithium ion battery 400 (not shown).

EXAMPLES

General Methods

Two porous separators are obtained or prepared and used in electrochemical cells, i.e., coin cells, of a lithium ion battery and the cycle performance of the as-prepared electrochemical cells is evaluated.

The electrochemical cells each include a commercial nickel-rich lithium-nickel-manganese cobalt oxide (NMC) positive electrode material with a diameter of 13.5 mm, a graphite (G) negative electrode material with a diameter of 14 mm, and a non-aqueous liquid electrolyte solution. The chemical composition of the NMC positive electrode material can be represented by the following chemical formula: $Li(Ni_{0.6}Co_{0.2}Mn_{0.2})O_2$ (NMC622). The non-aqueous liquid electrolyte solution included 1.0 M $LiPF_6$ in a mixture of ethylene carbonate (EC) and diethyl carbonate (DEC) at an EC:DEC ratio of 1:2 wt. % ($LiPF_6$/EC/DEC), and the volume used for each cell is 50 μL. The electrochemical cells are assembled in CR2032-type coin cells in an argon-filled glove box.

The cycle performance of the electrochemical cells is evaluated using Arbin BT2000 battery cyclers. Specifically, the electrochemical cells are cycled 25 times at a temperature of about 50° C. using an initial charge rate of C/20 (using the standard C rate definition) for three cycles, followed by a charge rate of C/6 for the remaining number of cycles.

Example 1

Figure 4:
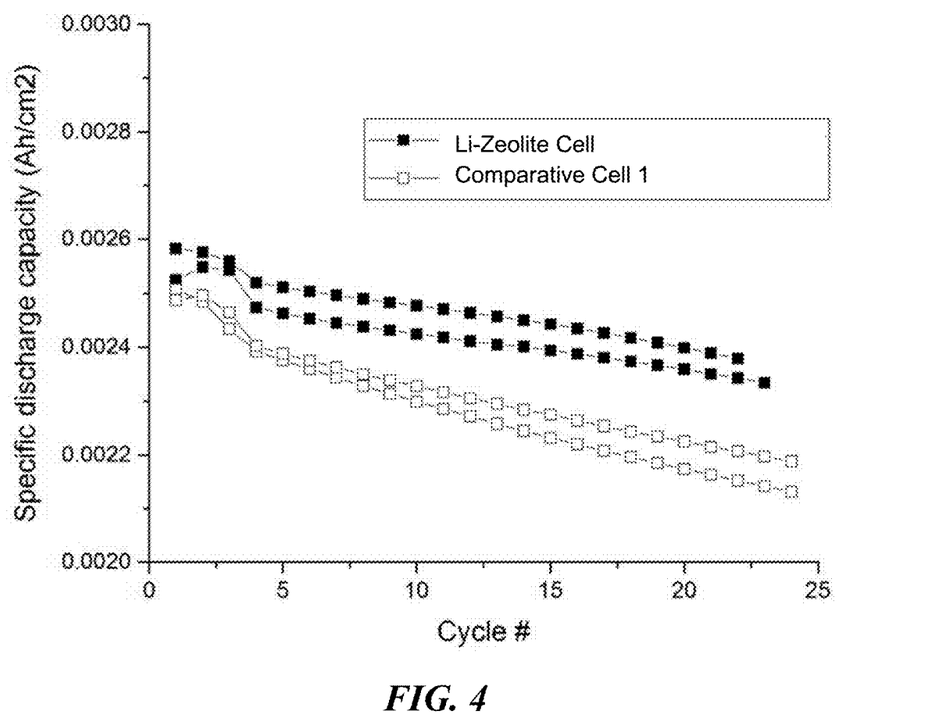
FIG. 4 depicts the Specific Capacity ($mAh/cm^2$) versus Cycle Number for the Comparative Cell 1 (white squares) and Li-Zeolite Cell (black squares).
Figure 5:
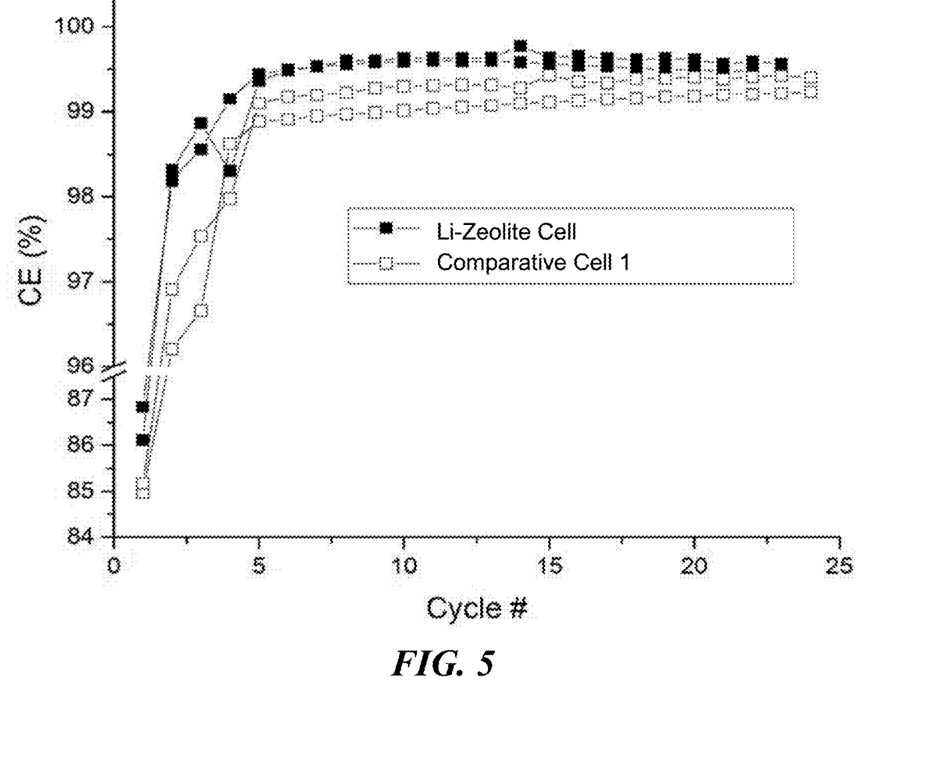
FIG. 5 depicts the Coulombic Efficiency (CE) (%) versus Cycle Number for the Comparative Cell 1 (white squares) and Li-Zeolite Cell (black squares).

An electrochemical cell including a porous separator including lithium ion-exchanged zeolite particles (referred to herein as "Li-Zeolite Cell") was prepared including the NMC622 positive electrode material, the graphite negative electrode material, a porous separator including lithium ion-exchanged zeolite particles (Li-zeolite particles), and the $LiPF_6$/EC/DEC electrolyte solution. Details regarding preparation of the Li-zeolite particles and the separator including Li-zeolite particles are provided below. The specific capacity and Coulombic Efficiency (CE) of the Li-Zeolite Cell was analyzed, and the results are shown in FIGS. 4 and 5, respectively.

Preparation of Li-Zeolite:

Aqueous solution of LiOH (Sigma-Aldrich) and zeolite ZSM-5 powder (Zeolyst International) was stirred at 80° C. for 24 hours to complete ion exchange between Li and other cations in the ZSM-5 zeolite to form Li-zeolite powder (Li-ZSM-5). Li-zeolite powder was collected and fully rinsed with deionized water to remove extra LiOH. Li-zeolite powder was finally calcined at 400° C. for 4 hour.

Fabrication of Li-Zeolite Coated Separator:

A commercial two-component (A+B) Soteras™ CCS binder (Ashland Inc.) was used to hold Li-zeolite particles on the plain polymeric separator (Celgard 2320). As a first step, the dilute 4-8 wt. % CCS A solution was prepared from the highly viscous 20 wt. % CCS A aqueous solution using a homogenizer at 5000 rpm (VWR 200) for 15 minutes.

Secondly, Li-zeolite powder was well dispersed in the dilute CCS A solution with the homogenizer for 15 minutes. Deionized water can be added to adjust the viscosity of slurry at this step. Finally, the pure CCS B liquid was added to the mixture. The slurry was further mixed for 15 minutes using the homogenizer. The mass ratio of CCS A to B was controlled to be 9:1. The mass ratio of CCS binder (A+B) to Li-zeolite was about 30%. Li-zeolite slurry was coated on one side of the Celgard 2320 separator with a mini-coater (MC-20, Hohsen). Li-zeolite coated separator sheet was dried in an oven at 80° C. for 10 minutes to complete crosslinking. After drying, Li-zeolite slurry was coated on the other side of the sheet following the same procedure mentioned above. All Li-zeolite coated separators were further dried under high vacuum ($10^{-5}$ Pa) at room temperature for at least 3 hours before coin cells fabrication. Surface morphology of Li-zeolite coated separator was obtained from a scanning electron microscope (SEM, Hitachi S-4800).

Comparative Example 2

A comparative electrochemical cell (referred to herein as "Comparative Cell 1") is prepared including the NMC622 positive electrode material, the graphite negative electrode material, a porous commercial ceramic ($Al_2O_3$) coated separator, and the $LiPF_6$/EC/DEC electrolyte solution. The porous separator included a polyethylene substrate with an alumina ($Al_2O_3$) coating on both sides the substrate. The specific capacity and Coulombic Efficiency (CE) of the Comparative Cell 1 was analyzed and the results are shown in FIGS. 4 and 5, respectively.

As shown in FIGS. 4 and 5, the Li-Zeolite Cell showed flat degradation, higher capacity retention and higher Coulombic Efficiency than the Comparative Cell 1.

Example 3

Figure 6:
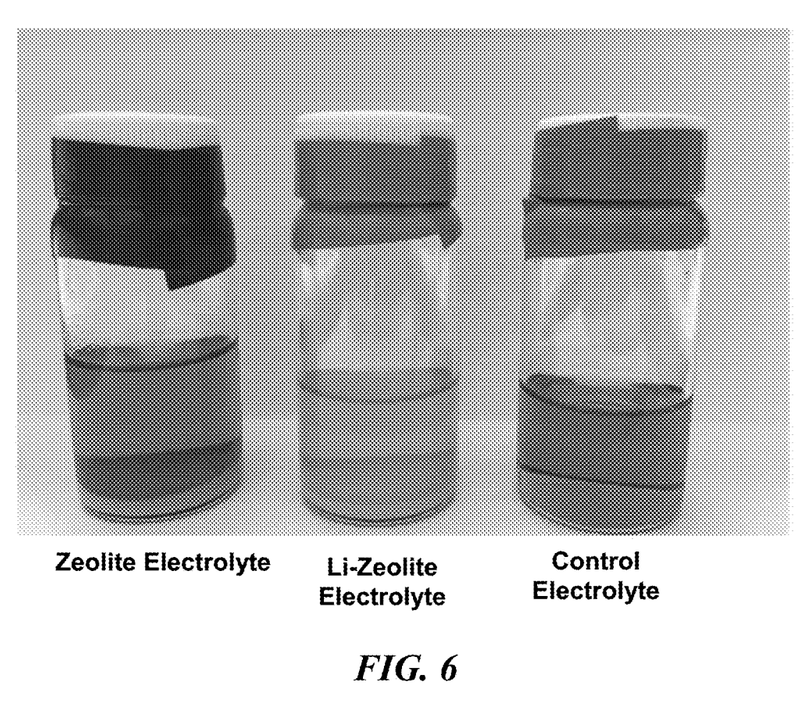
FIG. 6 is a photograph of the following three electrolyte solutions: zeolite electrolyte; Li-zeolite electrolyte; and control electrolyte.

Three electrolyte solutions were compared. Unless otherwise indicated, the electrolyte solutions were maintained in an Ar-filled glovebox with a humidity at about 1 ppm. An electrolyte solution, which was contaminated with trace water and other contaminants, was used as the "control electrolyte." The control electrolyte (20 ml) was mixed with 1 gram of lithium ion-exchanged zeolite particles as described above (Li-ZSM-5) by hand shaking for about 30 seconds and then the lithium ion-exchanged zeolite particles were allowed to settle down to the bottom of the container to form "Li-zeolite electrolyte." The control electrolyte (20 ml) was also mixed with 1 gram of zeolite particles as described above (ZSM-5) by hand shaking for about 30 seconds and then the zeolite particles were allowed to settle down to the bottom of the container to form "zeolite electrolyte." A photograph of the three solutions, control electrolyte, Li-zeolite electrolyte and zeolite electrolyte was taken and is shown in FIG. 6. The photograph of Li-zeolite electrolyte and zeolite electrolyte was taken about 10 minutes after mixing. As shown in FIG. 6, the Li-zeolite electrolyte became much clearer compared to the control electrolyte indicating that the Li-zeolite particles trapped the trace water and the other contaminates.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A porous separator for a lithium-containing electrochemical cell comprising:
    a porous substrate having a first side and an opposing second side; and
    an active layer comprising a mixture of lithium ion-exchanged zeolite particles and a polymeric binder, wherein the lithium ion-exchanged zeolite particles have:
    (i) an average pore size diameter of less than or equal to about 1 nm;
    (ii) an average particle diameter of less than or equal to about 20 μm;
    (iii) lithium cations present in an amount greater than or equal to about 90 at. % of extra-framework cations in the lithium ion-exchanged zeolite particles; and
    (iv) less than or equal to about 5 at. % of one or more of the following cations: $Na^+$, $K^+$, $Mg^{2+}$, $Ca^+$, $H^+$, and $NH_4^+$;
    wherein the active layer is present on both the first and second sides of the porous substrate, and the active layer has a thickness of less than or equal to about 20 μm.

2. The porous separator of claim 1, wherein the lithium ion-exchanged zeolite particles are present in the active layer in an amount of about 40 to about 95 wt. %.

3. The porous separator of claim 1, wherein the lithium ion-exchanged zeolite particles have one or more of the following:
    (i) an average pore size diameter of about 0.01 nm to about 1 nm;
    (ii) an average particle diameter of about 10 nm to about 20 μm; and
    (iv) a $SiO_2$:$Al_2O_3$ ratio of about 10 to about 50.

4. The porous separator of claim 1, wherein the lithium ion-exchanged zeolite particles have pore openings defined by 8-member rings, 9-membered rings, 10-membered rings, 12-membered rings or a combination thereof.

5. The porous separator of claim 1, wherein the lithium ion-exchanged zeolite particles comprise a zeolite material having a framework type selected from the group consisting of NAT, EDI, THO, ANA, YUG, GOO, MON, HEU, STI, BRE, FAU, MFI, LTL, LTA, and a combination thereof.

6. The porous separator of claim 1, wherein the lithium ion-exchanged zeolite particles comprise a zeolite material selected from the group consisting of zeolite A, zeolite Y, zeolite L, ZSM-5, and a combination thereof.

7. The porous separator of claim 1, wherein the lithium ion-exchanged zeolite particles comprise less than or equal to about 1 at. % of one or more of $Na^+$, $K^+$, $Mg^{2+}$, $Ca^+$, $H^+$ and $NH_4^+$ cations.

8. The porous separator of claim 1, wherein the active layer has a thickness of about 50 nm to about 20 μm.

9. The porous separator of claim 1, wherein the lithium ion-exchanged zeolite particles are formed from precursor zeolite particles comprising $H^+$ and $NH_4^+$ cations in an amount greater than one or more cations selected from the group consisting of $Na^+$, $K^+$, $Mg^{2+}$, and $Ca^+$.

10. A lithium-containing electrochemical cell comprising:
    a negative electrode layer;
    a positive electrode layer spaced apart from the negative electrode layer;

a porous separator disposed between confronting surfaces of the negative electrode layer and the positive electrode layer, wherein the porous separator comprises:
a porous substrate having a first side and an opposing second side; and
an active layer comprising a mixture of lithium ion-exchanged zeolite particles and a polymeric binder, wherein the lithium ion-exchanged zeolite particles have:
(i) an average pore size diameter of less than or equal to about 1 nm;
(ii) an average particle diameter of less than or equal to about 20 µm;
(iii) lithium cations present in an amount greater than or equal to about 95 at. % of extra-framework cations in the lithium ion-exchanged zeolite particles; and
(iv) less than or equal to about 1 at. % of one or more of the following cations: $Na^+$, $K^+$, $Mg^{2+}$, $Ca^+$, $H^+$, and $NH_4^+$;
wherein the active layer is present on both the first and second sides of the porous substrate, and the active layer has a thickness of less than or equal to about 20 µm; and
a liquid electrolyte infiltrating the negative electrode layer, the positive electrode layer, and the porous separator.

11. The lithium-containing electrochemical cell of claim 10, wherein the positive electrode layer comprises sulfur.

12. The lithium-containing electrochemical cell of claim 10, wherein the lithium ion-exchanged zeolite particles are present in the active layer in an amount of about 40 to about 95 wt. %.

13. The lithium-containing electrochemical cell of claim 10, wherein the lithium ion-exchanged zeolite particles are formed from precursor zeolite particles comprising $H^+$ and $NH_4^+$ cations in an amount greater than one or more cations selected from the group consisting of $Na^+$, $K^+$, $Mg^{2+}$, and $Ca^+$.

* * * * *